United States Patent [19]
Hata et al.

[11] 3,732,951
[45] May 15, 1973

[54] BRAKE MEANS FOR A BICYCLE

[75] Inventors: Kotaro Hata, Nara-shi; Toshikazu Fujii, Yao-shi, both of Japan

[73] Assignee: Matsushita Electric Industrial Co., Ltd., Osaka, Japan

[22] Filed: Feb. 19, 1971

[21] Appl. No.: 117,104

Related U.S. Application Data

[63] Continuation of Ser. No. 815,671, April 14, 1969, abandoned.

[30] Foreign Application Priority Data

Oct. 18, 1968  Japan .................................. 43/31944
Mar. 26, 1969  Japan .................................. 44/23437

[52] U.S. Cl. ......................... 188/24, 301/6 V, 301/97
[51] Int. Cl. ................................................. B62l 1/10
[58] Field of Search ........................... 188/24, 25, 26; 301/97, 6 V

[56] References Cited

UNITED STATES PATENTS 3,433,327  3/1969  Regis ..................................... 188/24
3,237,732  3/1966  Hayes ............................. 188/218 L X
3,305,048  2/1967  Brilando ............................... 188/24

FOREIGN PATENTS OR APPLICATIONS 1,063,506  12/1953  France ................................... 301/97

*Primary Examiner*—George E. A. Halvosa
*Attorney*—Steven, Davis, Miller & Mosher

[57] ABSTRACT

Brake means for a bicycle having a recessed portion provided on either one of the contact portions between a wheel rim and a brake rubber piece and extending in the direction of the periphery of said rim, the other of the contact portions being provided with at least one projection adapted to be brought into engagement with said recess, the arrangement being such that a wedging action is created when the recess and the projection are pressed with each other to produce a strong braking force. Further, the wheel rim may be provided on its recess or projection with unevenness across the recess or projection so as to facilitate draining of water and prevent the braking effect from being reduced in a rainy weather.

3 Claims, 11 Drawing Figures

INVENTORS
KOTARO HATA
TOSHIKAZU FUJII
BY Stevens, Davis, Miller & Mosher
ATTORNEYS

INVENTORS
KOTARO HATA
TOSHIKAZU FUJII

BRAKE MEANS FOR A BICYCLE

This is a continuation of application Ser. No. 815,671, filed Apr. 14, 1969, now abandoned.

The present invention relates to brake means in which brake rubber pieces are forced onto a wheel rim of a bicycle.

In a conventional bicycle wheel rim brake, both of the side or inner surfaces (2) of the wheel rim (1) on which brake rubber pieces (5) are pressed and the end surfaces (7) of the brake rubber pieces (5) are flat in shape, so that a sufficient frictional force cannot be obtained between the rubber pieces and the wheel rim during braking operation. Therefore, in a conventional bicycle brake system, a sufficient brake force cannot be obtained. Further, it has been proposed to provide an unevenness on either or both of the end surface of the brake rubber piece and the surface of the rim on which the rubber piece contacts, however, this cannot provide a sufficient brake force, either.

The present invention provides a brake means in which one of the co-operating surfaces of the rim and the brake rubber piece is provided with a recess extending along the peripheral direction of the rim, the other being provided with a projection for engagement with said recess, the wedge action between the recess and the projection being effective to provide a brake force which is stronger than that obtained in a conventional brake system.

Further, according to the present invention, the brake force can further be increased by providing radially extending unevenness on the braking surface of the wheel rim, the unevenness being also effective to drain water in a rainy weather to prevent the braking effect from being remarkably reduced.

The present invention will now be described with respect to the preferred embodiments thereof which are illustrated in the accompanying drawings, in which.

Figure 7:
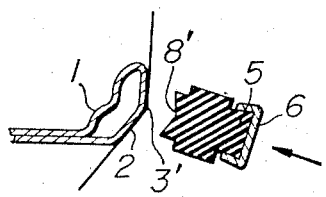
Figure 8:
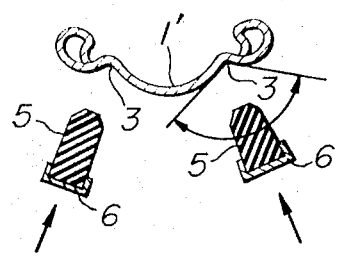
Figure 9:
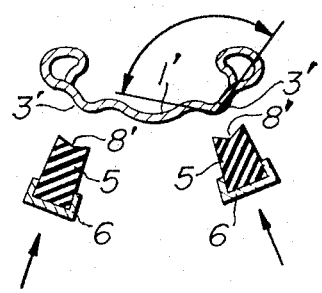
Figure 11:
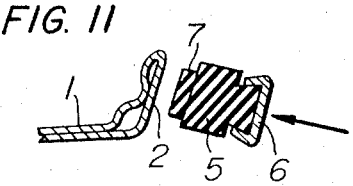
Figure 10:
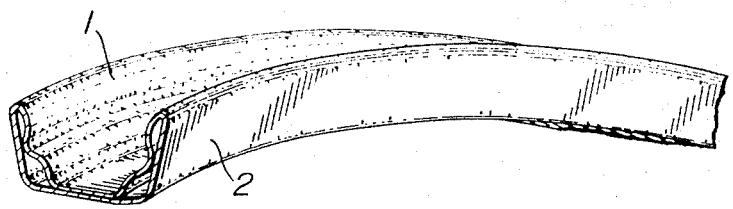

FIGS. 7, 8 and 9 respectively show the relation between the wheel rim and the brake rubber piece of further embodiments;

FIG. 10 is a fragmentary perspective view of a conventional wheel rim; and,

FIG. 11 is a sectional view showing the relation between the wheel rim shown in FIG. 10 and a co-operating brake rubber piece.

Referring to the drawings, the reference numeral 1 shows a wheel rim having opposite side surfaces 2 each of which is provided with an annular recess 3 extending in the peripheral direction so as to define a V-shaped cross-section of the side surface. The side surface 2 is further provided with a plurality of radially extending rooves 4. The numeral 5 shows a brake rubber piece having a portion 7 co-operating with the braking surface 2 of the wheel rim 1. The portion 7 is tapered to define a projecting central portion and provided at its end surface with a plurality of projections 8 which are adapted to be brought into engagement with the recess 3 of the wheel rim 1.

The numeral 9 shows spokes for the wheel, 10 shows a tire (an inner tube is not shown) mounted on the wheel rim 1, 11 shows a calliper type brake arms, 12 shows a brake wire, 13 shows an inner wire, and 14 shows frame members of a bicycle. During braking operation, the inner wire 13 is pulled in the upward direction whereby the arms 11 and 11 are rotated about a bolt 15 so that their free ends are brought toward each other, and the brake rubber pieces 5 carried thereon are pressed onto the rim 1.

In this instance, the projections 8 provided on the end surface of each brake rubber piece 5 are caused to enter the recess 3 of the rim 1, so that a wedging action is obtained between the brake rubber piece 5 and the rim 1 to produce a strong braking force. Further, the grooves 4 formed on the wall surface of the recess 3 of the rim 1 are effective to increase the braking force since the frictional force between the rim 1 and the brake rubber piece 5 is remarkably increased.

Figure 1:
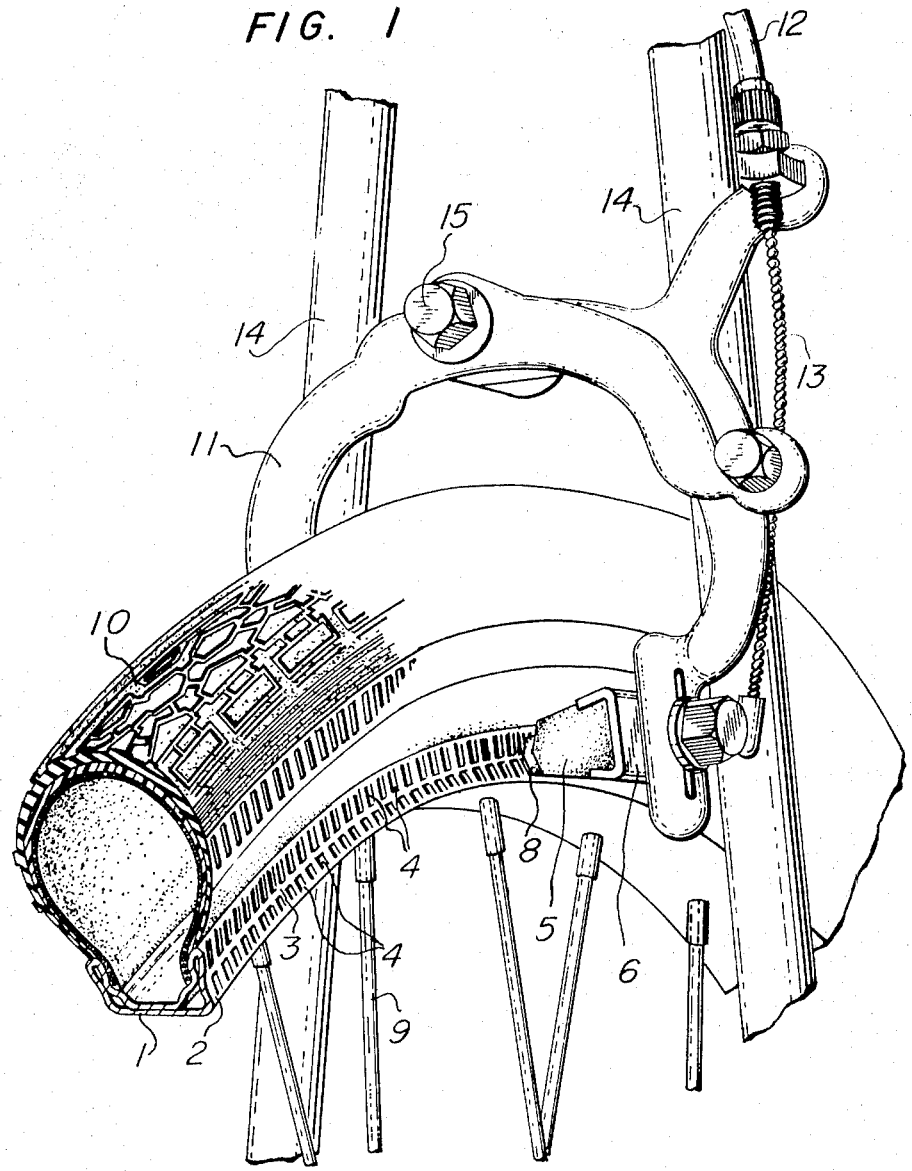
FIG. 1 is a perspective view showing one embodiment of the brake means in accordance with the present invention.
Figure 2:
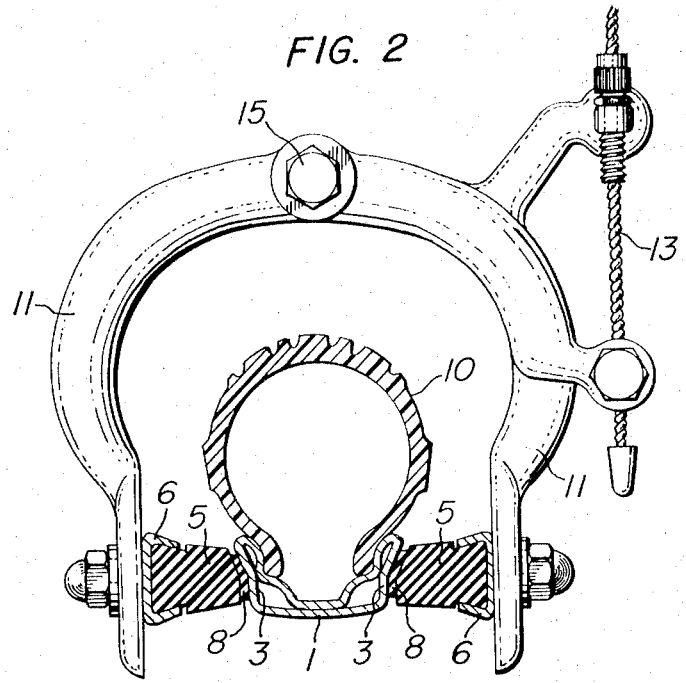
FIG. 2 is a fragmentary sectional view thereof.
Figure 3:
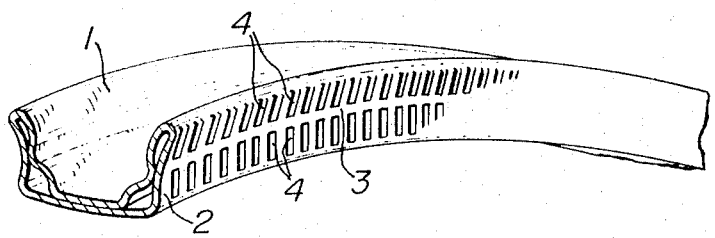
FIG. 3 is a perspective view of a portion of a wheel rim.
Figure 4:
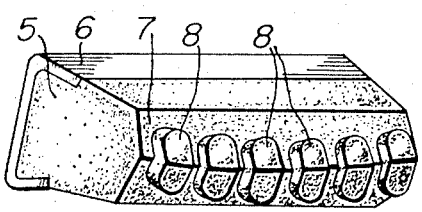
FIG. 4 is a perspective view of a brake rubber piece.
Figure 5:
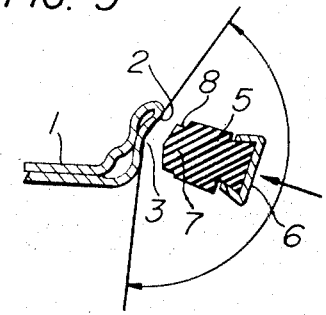
FIG. 5 is a sectional view showing the relationship between the braking surface of the wheel rim and the brake rubber piece.
Figure 6:
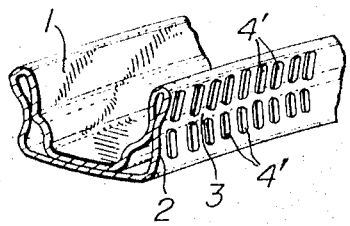
FIG. 6 is a fragmentary perspective view of the wheel rim in accordance with another embodiment of the present invention.

It has been experienced, in a prior brake system, that a water film is formed on the braking surface 2 of the rim 1 in a rainy weather, with the result that the braking force is remarkably reduced as compared with that obtained in a dry condition. This is known as a "hydroplaning effect". However, according to the present invention, since the groove 4 is directed radially or perpendicularly to the periphery of the rim 1 and at least in part communicates with the radial outer periphery of the rim, water can be drained in a preferable way so that the braking effect will not be substantially reduced even in a wet condition A similar effect can be expected by providing projections 4' on the braking surface 2 of the rim 1 as shown in FIG. 6 in the place of the groove 4. Further, it is not essential to provide projections 8 on the end surface of the brake rubber piece 5 but it may be sufficient that end surface of the rubber piece 5 projects so that it can engage with the recess 3 of the rim 1.

Further, in lieu of providing an annular recess of V-shaped cross-section, the braking surface of the rim 1 may be provided with a convex portion 3' as shown in FIG. 7 extending in the peripheral direction, the end surface of the brake rubber piece being provided with a recessed groove 8' for co-operating with the convex portion 3', the wedging action between the convex portion 3' and the recessed groove 8' being effective to produce a strong braking effect.

Where the braking surface is provided on the inner surface of the rim, such as the rim 1' shown in FIGS. 8 and 9, the braking surface may be provided with one or more annular recesses 3 or beads 3', the brake rubber piece 5 being provided with a projection 8 or a recessed groove 8'.

From the above description, it will be apparent that the brake means in accordance with the present invention provides greater braking force as compared with a conventional one, and the braking effect will not be adversely effected by a rainy weather. Thus, the present invention is very effective in ensuring the safety feature of a bicycle.

We claim:

1. An improved brake means for a bicycle comprising a wheel rim including an inner and outer circumference and having a V-shaped annular recess formed peripherally in each side surface thereof; said V-shaped annular recess having a plurality of alternate, radially directed concavities in communication with said wheel rim outer circumference and convexities formed in each wall of said recesses, a rubber brake block on each side of said rim opposing said braking surfaces, each said brake block having a braking surface portion projecting in a V-shape complementary to said V-shaped annular recesses, a plurality of alternate, radially directed concavities and convexities formed on each said braking surface portion and means for pressing said rubber brake blocks into said V-shaped annular recesses at the time of braking whereby a braking effect is produced by the wedging action of said rubber brake blocks.

2. An improved brake means as defined in claim, 1 wherein said concavities and said convexities are formed by a plurality of radially directed grooves in the walls of said V-shaped annular recesses.

3. An improved brake means as defined in claim 1, wherein said concavities and said convexities are formed by a plurality of radially directed projections on the walls of said V-shaped annular recesses.

* * * * *